(12) United States Patent
Liaw

(10) Patent No.: US 12,345,353 B2
(45) Date of Patent: Jul. 1, 2025

(54) SAFETY HANDLE FOR FAUCET

(71) Applicant: Y-Tan Liaw, Taipei (TW)

(72) Inventor: Y-Tan Liaw, Taipei (TW)

( * ) Notice: Subject to any disclaimer, the term of this patent is extended or adjusted under 35 U.S.C. 154(b) by 0 days.

(21) Appl. No.: 18/385,836

(22) Filed: Oct. 31, 2023

(65) Prior Publication Data

US 2025/0137552 A1    May 1, 2025

(51) Int. Cl.
*F16K 35/02*    (2006.01)
*E03C 1/04*    (2006.01)
*F16K 31/60*    (2006.01)

(52) U.S. Cl.
CPC .......... *F16K 35/025* (2013.01); *E03C 1/0412* (2013.01); *F16K 31/607* (2013.01)

(58) Field of Classification Search
CPC ..... F16K 35/025; F16K 31/602; E03C 1/0412
See application file for complete search history.

(56) References Cited

U.S. PATENT DOCUMENTS

| | | | | |
|---|---|---|---|---|
| 5,470,044 A | * | 11/1995 | Chi | F16K 35/025 251/102 |
| 6,082,598 A | * | 7/2000 | Lee | B67D 3/04 222/509 |
| 6,086,045 A | * | 7/2000 | Moon | F16K 35/025 251/114 |
| 6,962,319 B2 | * | 11/2005 | Zheng | B67D 1/0878 222/509 |
| 2010/0258203 A1 | * | 10/2010 | Meyer | F16K 41/103 251/109 |

* cited by examiner

*Primary Examiner* — Reinaldo Sanchez-Medina
*Assistant Examiner* — Nicole Gardner
(74) *Attorney, Agent, or Firm* — Ying-Ting Chen; Law Office of Michael Chen

(57) ABSTRACT

A safety handle for a faucet is disclosed. The faucet is composed of a valve body, a top cover, an elastic valve element, a working rod and a first spring. The safety handle is a fool-proof device. Unless the safety handle is clamped by them user, the safety handle cannot actuate the working rod to compress the elastic valve element, causing liquid to flow through the valve body.

15 Claims, 19 Drawing Sheets

SAFETY HANDLE FOR FAUCET

FIELD OF THE INVENTION

The present invention relates to a safety handle. More particularly, the present invention relates to a safety handle for a faucet for preventing excessive liquid from flowing out of the faucet under the condition of inadvertent use.

BACKGROUND OF THE INVENTION

A faucet is a valve that controls the flow of liquid. It is commonly seen in our daily life. There are many types and objects of use of faucets. Classified by type, faucets include handle type, knob type, lift type and induction type. Among them, the handle type faucet is the most commonly used one.

Cross-sectional views of a conventional faucet are provided in FIG. 1 and FIG. 2. FIG. 1 shows the faucet is in a close status and FIG. 2 shows the faucet is in an open status. The faucet has a body 1 with an inlet 1a and an outlet 1b. Liquid, e.g., water, can flow into the body 1 from the inlet 1a and be controlled to flow out of the body 1 from the outlet 1b. The faucet also has a valve space 1c for accommodating a valve mechanism for controlling liquid flow. The valve mechanism is composed of a hollow elastic valve element 2, a working stem 3 and a spring 4. The hollow elastic valve element 2 may be made of rubber, silicone, EPDM or other materials with elastomer characteristic and have an open end 2a and a closed end 2b. The closed end 2b has a contact area which is larger than an area of an opening of the outlet 1b. Thus, when the closed end 2b is closely contacted with the opening of the outlet 1b, the liquid in the valve space 1c and the inlet 1a can not pass through the opening of the outlet 1b. A fixing ring 2c is formed inside the hollow elastic valve element 2 and is structurally positioned closer to the closed end 2b. The working stem 3 has a top end 3a and a bottom end 3b. The bottom end 3b forms a flange. The bottom end 3b of the working stem 3 can pass through the fixing ring 2c and be fixed in a space enclosed by the fixing ring 2c and the inner surface of the closed end 2b. The top end 3a passes through a top board 1d of the body 1. Between the top end 3a and the bottom end 3b, the working stem 3 is surrounded by the spring 4. The working stem 3 has a limit flange 3c. One end of the spring 4 contacts the limit flange 3c while the other end contacts the top board 1d. The spring 4 is compressed and extends between the limit flange 3c and the top board 1d. The open end 2a also forms a flange and the flange is fixed by the top board 1d and the wall of the body 1 enclosing the valve space 1c. A handle 5 with a rotatable base 5a is used to switch the valve. The rotatable base 5a and the top end 3a are rotatably connected with a pin. The rotatable base 5a has a self-closing side and closing side.

Comparing FIG. 1 and FIG. 2, when the handle 5 is pressed or pulled, the wider side of the rotatable base 5a is forced to be close to the top end 3a, lifting the working stem 3. Thus, the bottom end 3b shortens the length of the hollow elastic valve element 2 by the fixing ring 2c and the spring 4 is compressed. At this moment, the closed end 2b leaves away from the opening of the outlet 1b. As shown in FIG. 2, the liquid flows out of the outlet 1b following the direction of the arrows. When the force pressing or pulling the handle 5 is removed, the spring 4 stretches back to the original status, causing the position of the handle 5 changed from FIG. 2 to FIG. 1 and the closed end 2b contacting the opening of the outlet 1b again. The liquid stops running. This is how the faucet works.

The design of the faucet is easy and the use of the faucet is convenient. However, it cannot be avoided from being used carelessly. If the faucet is used to control the provisioning of a dangerous liquid, for example, hot water, any careless mistouch of the handle 5 will make the hot water released. A fool-proof design for the handle 5 is very important.

Many priors had disclosed solutions for the fool-proof design. For example, US patent application publication No. 2003/0001124 provides a safety device of a water faucet. It includes a safety bolt mounted on a water faucet to function as a secondary control of operation of the control handle and the control rod of the water faucet. The design is simple. However, the safety bolt is tiny and located behind the control handle. People use the water faucet might neglect the safety bolt and unintentional touch on the control handle would happen. Another prior is provided by U.S. Pat. No. 9,061,876. '876 is a faucet, optimized from U.S. Pat. No. 5,449,144. It is characterized in that the faucet has an actuator handle assembly. The actuator handle assembly is operatively coupled to the outer end of the working stem 3. The actuator handle assembly includes a lever pivotally connected to the outer end of the working stem 3 and a cam actuator movably connected to the lever. The cam actuator moves to and between: (i) an engaged position in which pivoting movement of the lever relative to the working stem 3 is effective to cause the lever to exert a pulling force on the working stem 3 and, (ii) a disengaged position in which pivoting movement of the lever relative to the working stem 3 is ineffective to cause the lever to exert a pulling force on the working stem 3. Namely, the actuator handle assembly is an effective fool-proof design since the position of the cam actuator decides whether the actuator handle assembly can be functioned or not. However, there are still risks for '144 in use. Although the actuator handle assembly is convenient in use, if there is no stop structure, it is easy for people to touch the actuator handle assembly by mistake and let the liquid flow out from the faucet.

In order to settle the shortcomings in the faucet mentioned above, an innovative safety handle for a faucet is invented and disclosed.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In order to settle the problem mentioned, a safety handle for a faucet is disclosed. The safety handle comprises: a hollow base portion having two rotating rods rotatably connected to a working rod of the faucet and a base opening formed next to the rotating rods; a safety teeth driving portion coupled with and being capable of moving up and down relative to the hollow base portion, having two safety teeth through the base opening; and a second spring placed between the hollow base portion and the safety teeth driving portion, providing force to move the safety teeth driving portion up relative to the hollow base portion.

The faucet comprises: a valve body for conducting liquid, having an inlet tube portion and an outlet tube portion, wherein an accommodating space where the inlet tube portion is connected to is formed inside the outlet tube portion, an outlet tube in the outlet tube portion connects the accommodating space and external environment, and a first thread ring part is formed in the outlet tube portion opposite to the outlet tube; a top cover having a top board and a second thread ring part formed therearound, wherein the second thread ring part is removably connected to the first thread ring part, and a central hole is formed through the top board; an elastic valve element fixed in the accommodating space with a bottom curved surface sealing an entrance of the outlet tube to the accommodating space and an opening portion contacting an inner side of the top board, forming a hollow portion in the center and having a fixing ring inwardly formed inside the hollow portion; the working rod mounted in the hollow portion, having a connecting end rotatably connected to the rotating rods and an anchoring end, wherein the working rod goes through the central hole with the connecting end left on an outer side of the top board, two anchoring flanges are formed on the anchoring end, and the fixing ring is clipped by the anchoring flanges; and a first spring placed coaxially around the working rod, being compressed by one of the anchoring flanges and the top board.

When the safety teeth driving portion moves down relative to the hollow base portion and the safety teeth contact the outer side of the top board, a torque applied to the safety handle causes the rotating rods to lift the working rod with the safety teeth being a fulcrum, so that the elastic valve element is compressed by the fixing ring moved with the anchoring flanges, the bottom curved surface is away from the entrance, and the liquid in the inlet tube portion and the accommodating space is able to flow through the outlet tube.

According to the present invention, the opening portion of the elastic valve element has a round opening at the top and a ring connection connecting with a surround side wall of the hollow portion at the bottom.

According to the present invention, a ring protrusion of the opening portion is formed and extended from the top board between the second thread ring part and the central hole, the round opening contacts the area between the second thread ring part and the ring protrusion, and the opening portion is limited to move by the second thread ring part and the ring protrusion.

According to the present invention, a ring platform is formed between the accommodating space and the first thread ring part for holding the ring connection of the opening portion.

According to the present invention, two L-shaped grooves symmetrical to each other are formed at the connecting end relative to a longitudinal section of the working rod, and each L-shaped groove has a side opening facing the same direction.

According to the present invention, two rotating shafts are respectively formed on adjacent opposite sides of the two rotating rods of the hollow base portion, and each rotating shaft is installed in one L-shaped groove of the working rod through the corresponding side opening.

According to the present invention, the hollow base portion further comprises: a base board; a surrounding body enclosing the base board and the base opening, having a plurality of side walls, wherein a portion of the top of the surrounding body is depressed to form a depressed area; two safety teeth guide bars parallel to the rotating rods, formed inside the surrounding body from two opposite side walls, respectively, for guiding movement of the safety teeth; two first auxiliary guide bars parallel to the safety teeth guide bars, formed inside the surrounding body from two opposite side walls, respectively, for auxiliary guiding movement of the safety teeth driving portion; and an installed rod formed on the base board for installing the second spring.

According to the present invention, the safety teeth driving portion further comprises: a bent top plate having a bent area and a finger pressing area; two auxiliary guide boards formed below the bent area and a portion of the finger pressing area, wherein two safety teeth extend from the auxiliary guide boards, respectively, two safety teeth guide grooves are formed on two safety teeth and two auxiliary guide boards, respectively, each safety teeth guide bar of the hollow base portion is moveably installed in one safety teeth guide groove to guide movement of the safety teeth, two second auxiliary guide grooves are formed on two auxiliary guide boards, respectively, each first auxiliary guide bar of the hollow base portion is moveably installed in one second auxiliary guide groove to auxiliary guide movement of the safety teeth driving portion; and a pair of arc columns formed below the finger pressing area and located corresponding to the installed rod for accommodating the second spring and limiting movement of the second spring. The finger pressing area rests on the depressed area when the safety teeth driving portion moves down relative to the hollow base portion.

According to the present invention, two inner lateral depressions are further formed on the two opposite side walls of the hollow base portion, respectively, two hooks are further formed below the finger pressing area, and each hook hooks the brink of one inner lateral depression to prevent the safety teeth driving portion from separating from the hollow base portion.

According to the present invention, an anti-slip depression is further formed in the top surface of the finger pressing area.

According to the present invention, an external thread or an internal thread is formed on one end of the inlet tube portion for connecting a pipe.

According to the present invention, a fillet is formed on the end of the safety teeth.

According to the present invention, the safety teeth driving portion and the hollow base portion are made of Nylon.

According to the present invention, the first spring and the second spring are made of stainless steel.

The safety handle is a fool-proof device. Unless the safety handle is clamped by the user, the safety handle cannot actuate the working rod to compress the elastic valve element, causing liquid to flow through the valve body.

DETAILED DESCRIPTION OF THE PREFERRED EMBODIMENTS

The present invention will now be described more specifically with reference to the following embodiments.

Figure 1:
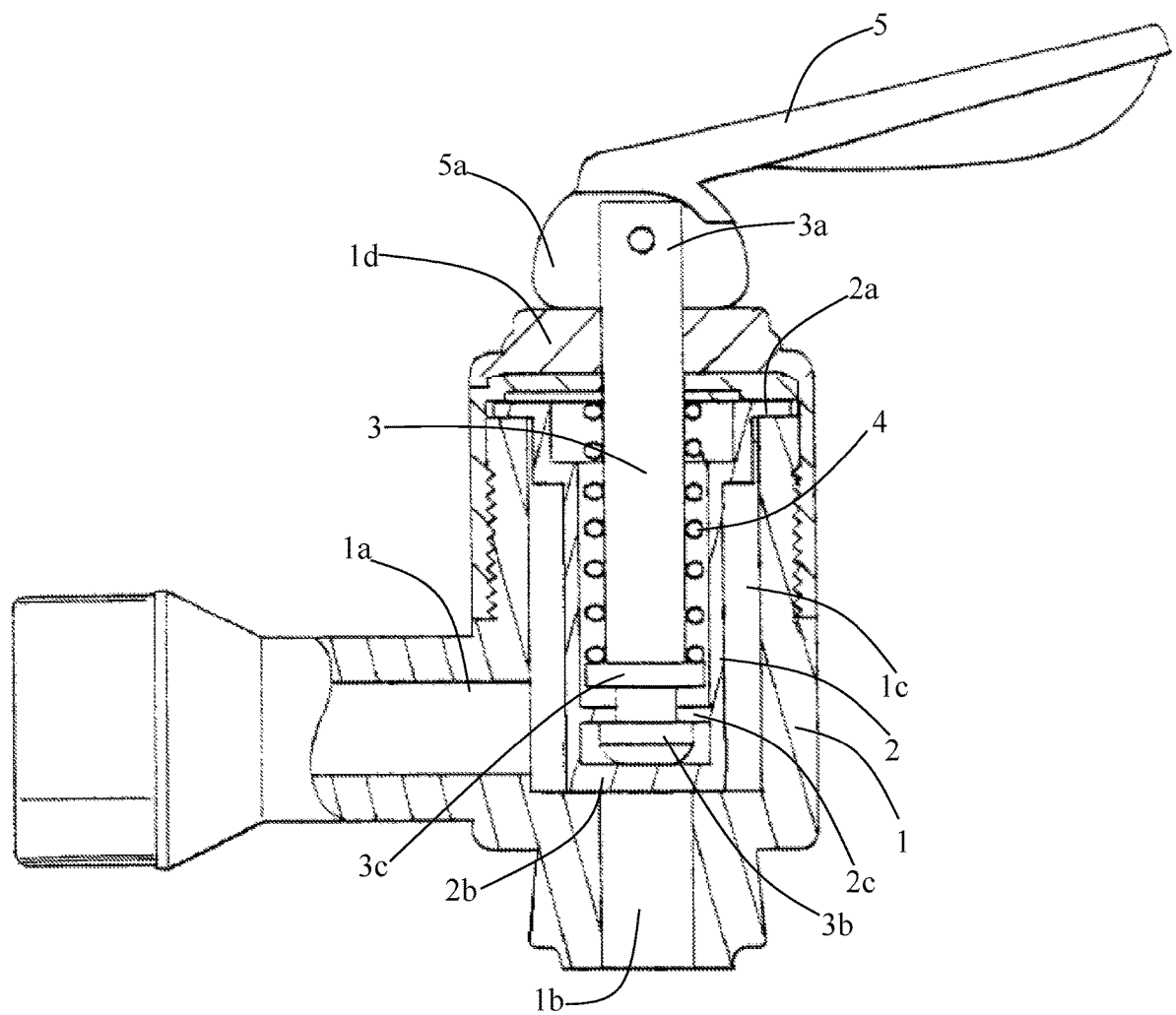
FIG. 1 is a cross-sectional view of a conventional faucet in a close status.
Figure 2:
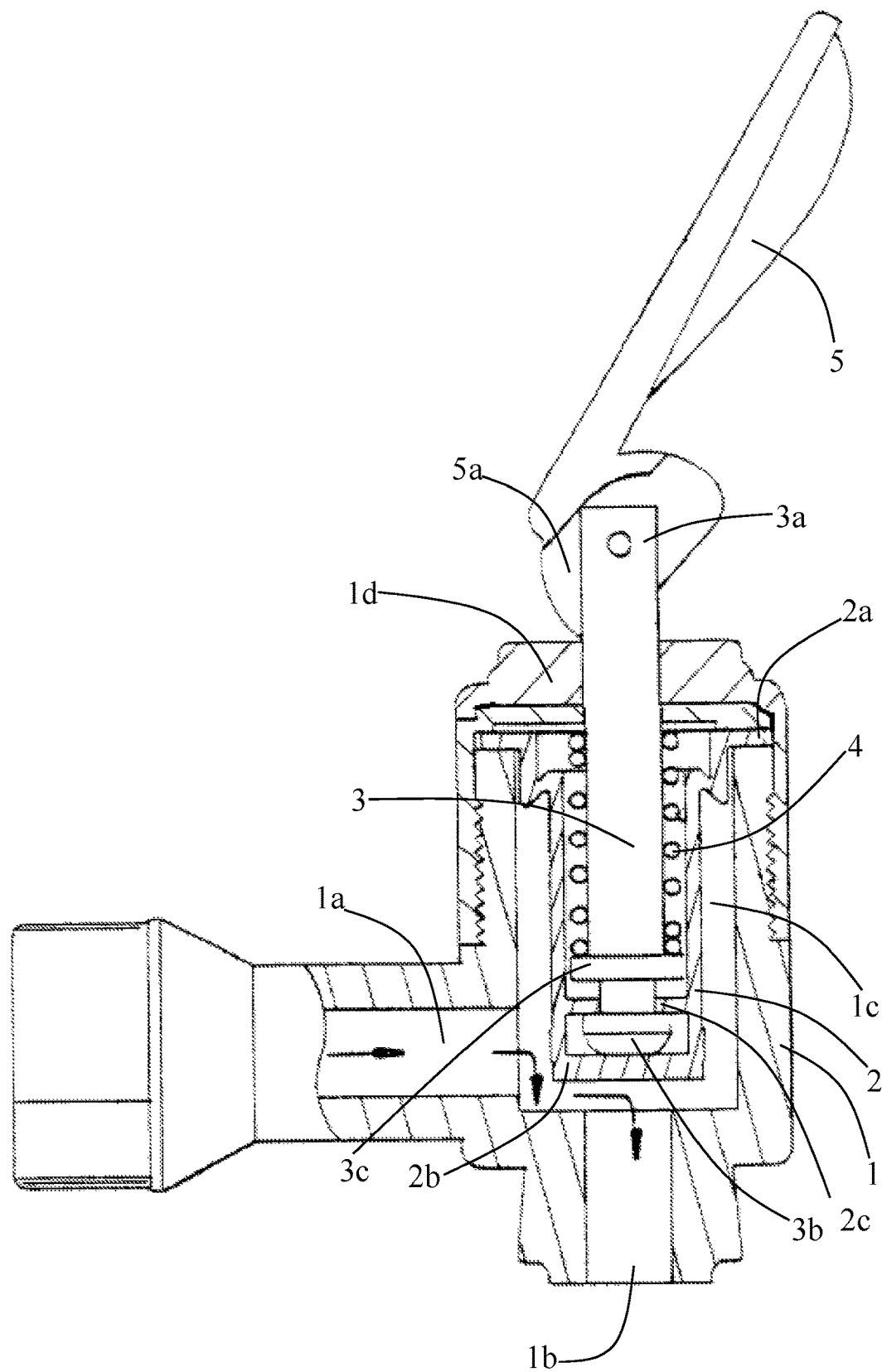
FIG. 2 is a cross-sectional view of the conventional faucet in an open status.
Figure 3:
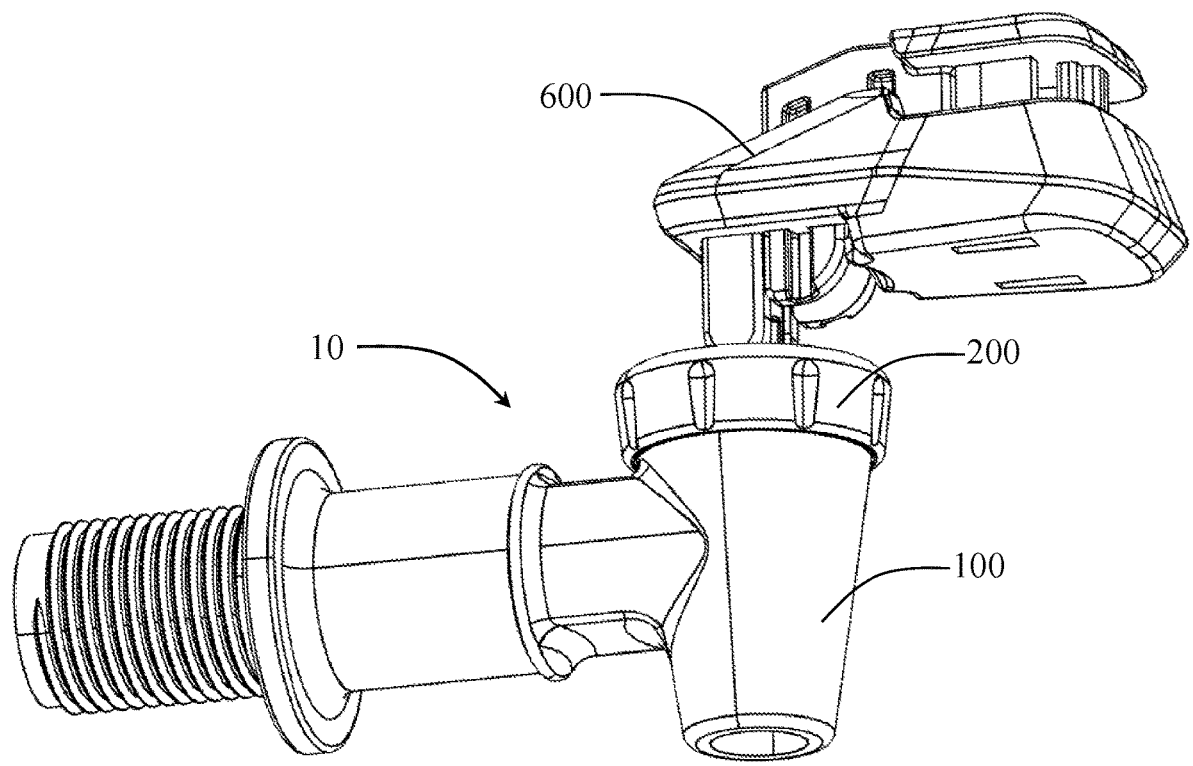
FIG. 3 is a stereogram of an embodiment of a safety handle for a faucet according to the present invention.
Figure 4:
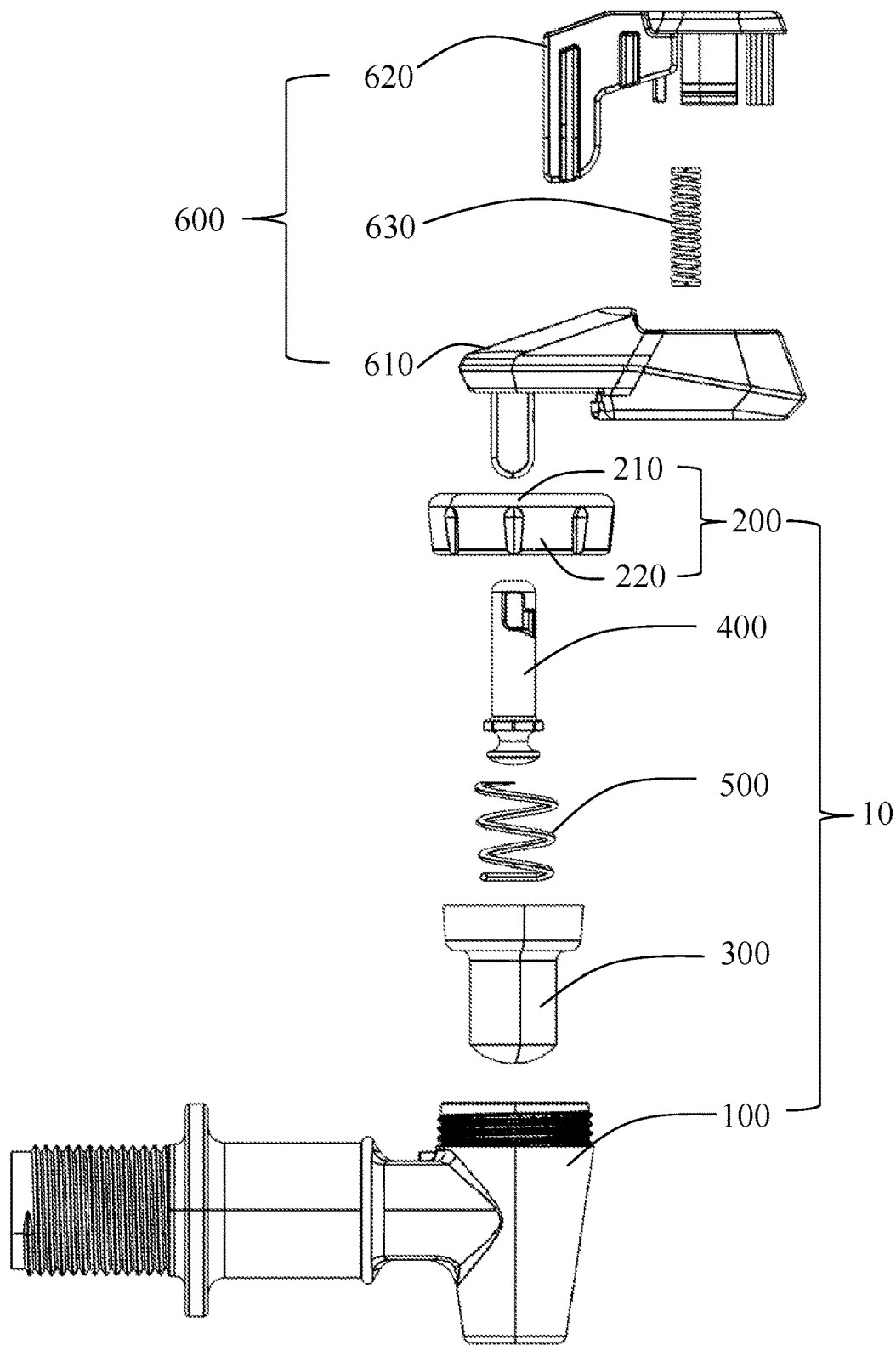
FIG. 4 is an explosion diagram of the faucet and the safety handle.

Refer to FIG. 3 and FIG. 4. FIG. 3 is a stereogram of an embodiment of a safety handle 600 for a faucet 10 according to the present invention. FIG. 4 is an explosion diagram of the faucet 10. The faucet 10 is used to control the provision of a liquid, such water, wine, chemical reagent, etc. So, the faucet 10 is linked to a pipe for that liquid. The faucet 10 is composed of a valve body 100, a top cover 200, an elastic valve element 300, a working rod 400, and a first spring 500. The shape, material, function, and mutual action of each of the aforementioned components of the faucet 10 and the safety handle 600 will be described in detail below.

Figure 5:
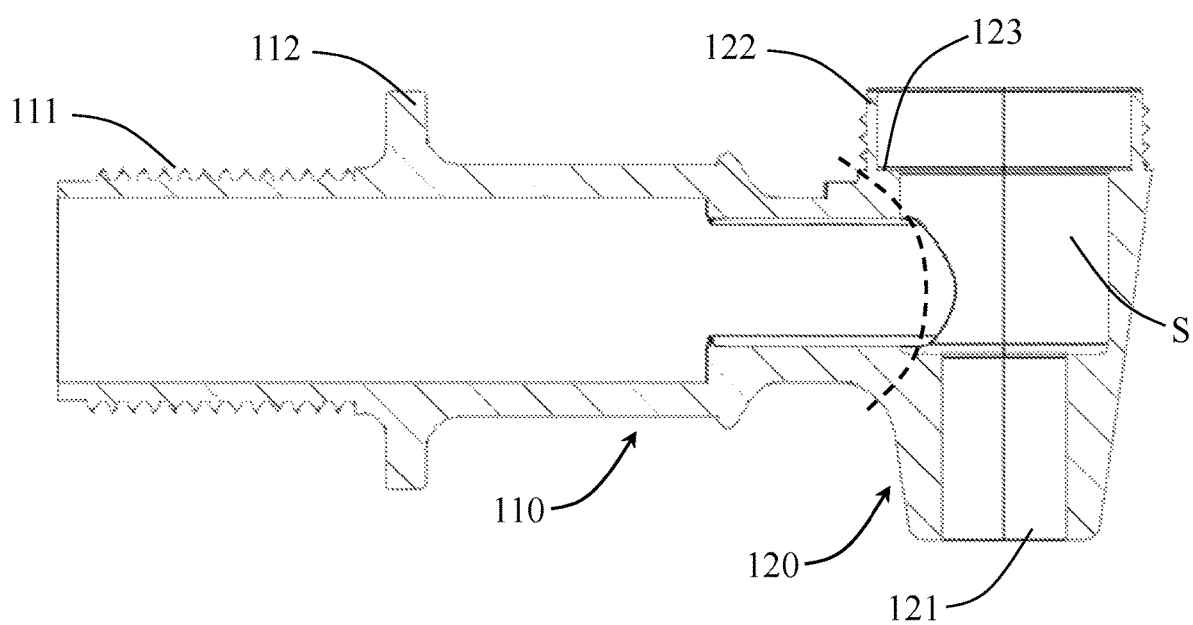
FIG. 5 is a sectional view of a valve body.
Figure 6:
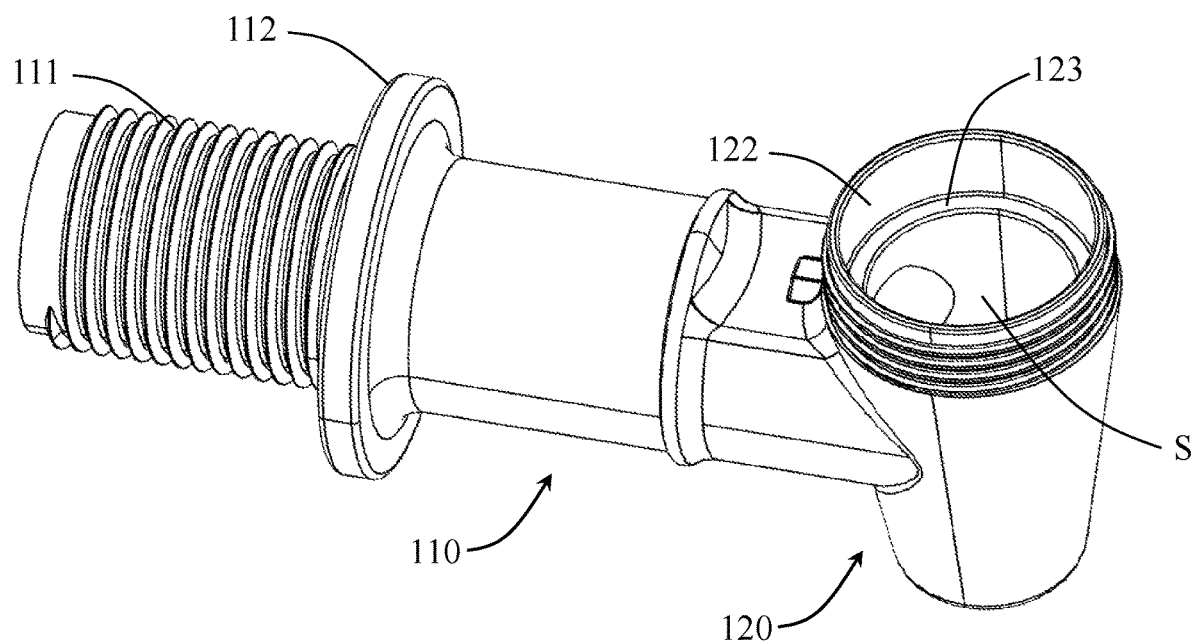
FIG. 6 is a stereogram of the valve body.

See FIG. 5 and FIG. 6. FIG. 5 is a sectional view of the valve body 100 and FIG. 6 is a stereogram of the valve body 100. The valve body 100 is a design for conducting the liquid. The liquid is controlled by the elastic valve element 300 to flow out of the valve body 100 or stay in the valve body 100. In terms of structure. The valve body 100 may be divided into two portions: an inlet tube portion 110 and an outlet tube portion 120. Since the two portions are integrally formed, a dashed curve in FIG. 5 is used to separate the two according to the definitions of functions. The inlet tube portion 110 deals with the liquid from a source and the outlet tube portion 120 is in charge of storage and discharge of the liquid. It is shown in FIG. 5 that the inlet tube portion 110 and the outlet tube portion 120 are connected. An accommodating space S is formed inside the outlet tube portion 120. The accommodating space S is located in where the inlet tube portion 110 connected to the outlet tube portion 120. An outlet tube 121 in the outlet tube portion 120 connects the accommodating space S and external environment. A first thread ring part 122 is formed in the outlet tube portion 120 opposite to the outlet tube 121. In this embodiment, the first thread ring part 122 has an external thread on the outer surface. In other embodiments, the first thread ring part 122 may have an internal thread on the inner surface. The cross-sectional area of the first thread ring part 122 is larger than that of the accommodating space S. Therefore, a ring platform 123 is formed between the accommodating space S and the first thread ring part 122. The function of the ring platform 123 will be illustrated later.

The inlet tube portion 110 is used to connect to the source, such as a pipe, some connecting interface is required. In this embodiment, an external thread 111 is formed on one end of the inlet tube portion 110 for connecting the pipe. In other embodiments, the external thread 111 may be changed to an internal thread. Material-wise, the valve body 100 may be made of any material used for current faucets. The inlet tube portion 110 may have a design of a flange 112 to seal the end of the pipe.

The material of the valve body 100 may be but not limited to metal, such as brass, stainless steel and cast iron, plastic, such as PVC, ABS and PP, and ceramic.

Figure 7:
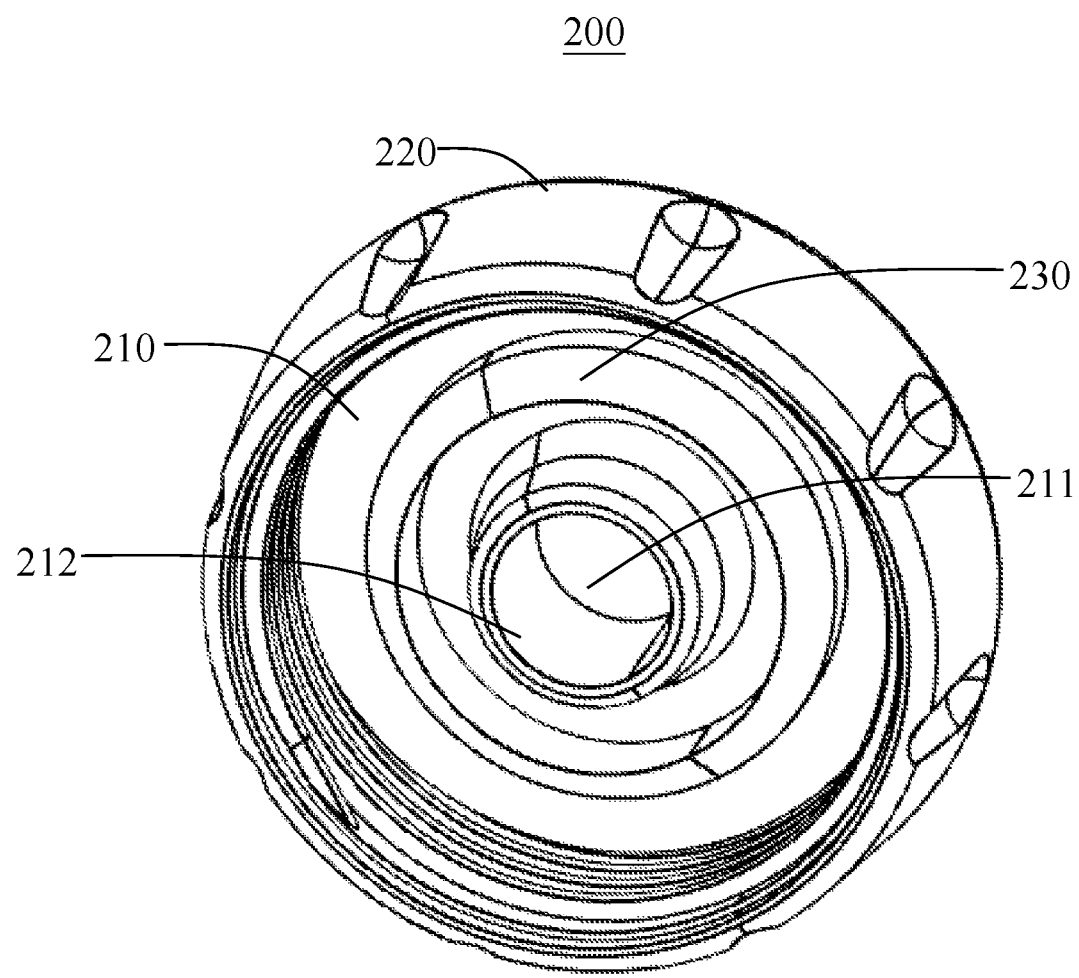
FIG. 7 is a stereogram of a top cover.

See FIG. 7. It is a stereogram of the top cover 200. The top cover 200 is used to seal the opening of the first thread ring part 122 along with the elastic valve element 300. The top cover 200 includes a top board 210 on the inside, a second thread ring part 220 and a ring protrusion 230. The second thread ring part 220 is like a skirt and formed around the top board 210. In this embodiment, the second thread ring part 220 has an internal thread formed on the inner surface of the second thread ring part 220. The second thread ring part 220 and the first thread ring part 122 conform to the same industry specification. Thus, the second thread ring part 220 is removably connected to the first thread ring part 122. If the first thread ring part 122 has an internal thread, the second thread ring part 220 should have an external thread. A central hole 211 is formed through the top board 210. In this embodiment, the central hole 211 is a round hole. The size of the central hole 211 is a little larger than the cross-sectional area of the working rod 400. In practice, the shape of the central hole 211 is not restricted to be circular and can be the same as the shape of the cross-sectional shape of the working rod 400. The ring protrusion 230 is formed and extended from the top board 210 between the second thread ring part 220 and the central hole 211. Since the working rod 400 needs to work vertically enough when the safety handle 600 is pressed, the top board 210 needs to control the movement of the working rod 400 so that it will not be away from a designed route, a restricting ring 212 is formed on the inner surface of top board 210 around the central hole 211. The end of the working rod 400 is restricted to move inside the restricting ring 212. The top board 210, the second thread ring part 220, the ring protrusion 230 and the restricting ring 212 are integrally formed. Material-wise, the top cover 200 can use the same material used for the valve body 100.

Figure 8:
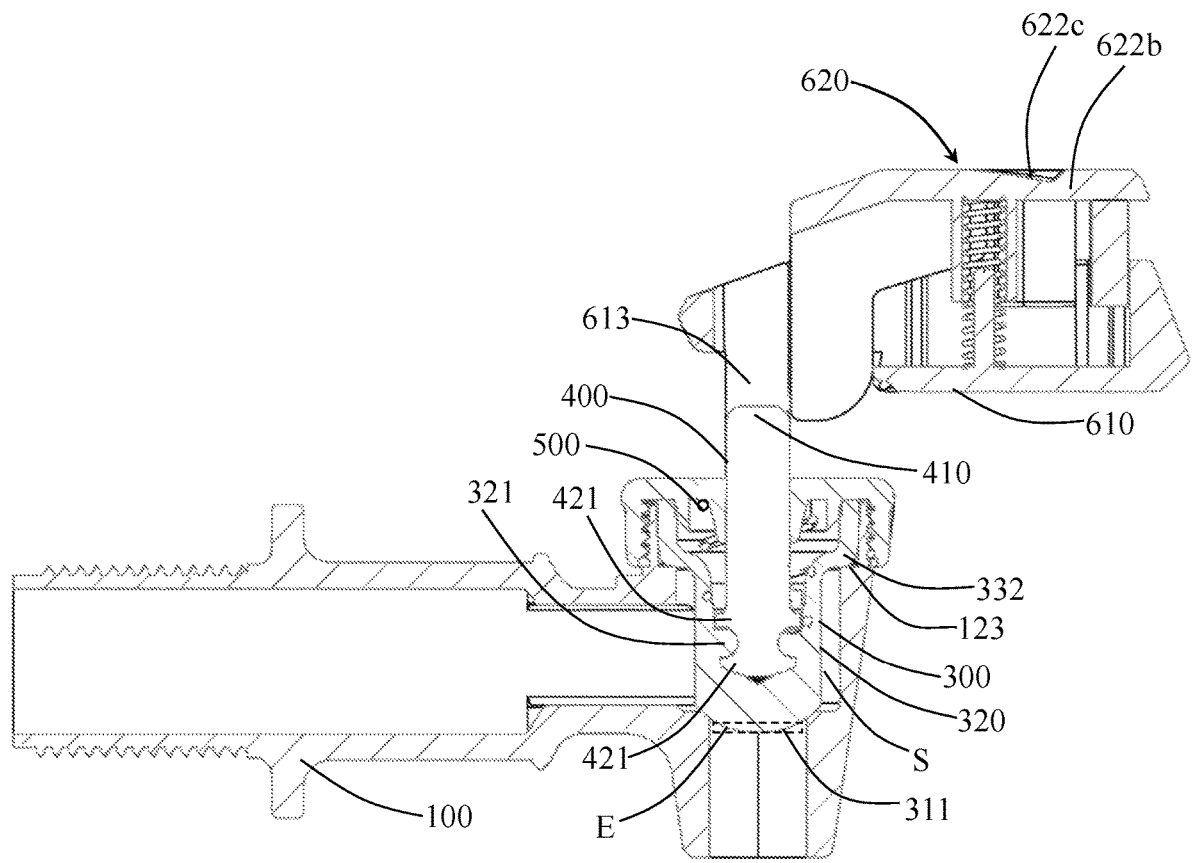
FIG. 8 is a cross-sectional view of the faucet.
Figure 9:
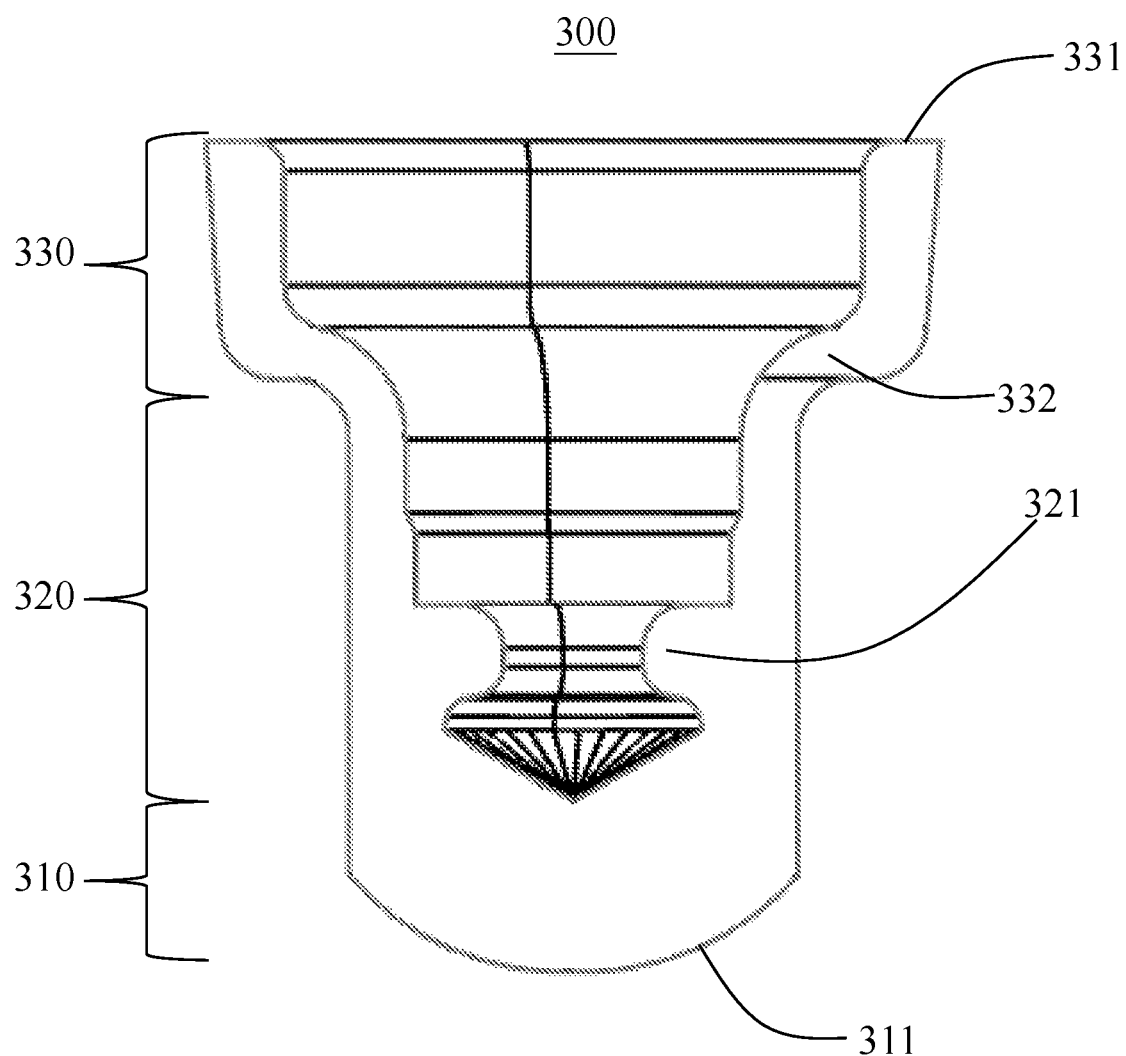
FIG. 9 is a cross-sectional view of an elastic valve element.

Refer to FIG. 8 and FIG. 9. FIG. 8 is a cross-sectional view of the faucet 10. FIG. 9 is a cross-sectional view of the elastic valve element 300. The elastic valve element 300 is fixed in the accommodating space S. The elastic valve element 300 has a sealing portion 310, a hollow portion 320 and an opening portion 330. The sealing portion 310 has a bottom curved surface 311 which seals an entrance E (indicated by a dashed rectangular frame) of the outlet tube 121 to the accommodating space S. The hollow portion 320 is in the center of the elastic valve element 300. A fixing ring 321 is inwardly formed inside the hollow portion 320. Two sides of the fixing ring 321 leave space for accommodating a portion of the working rod 400. The opening portion 330 contacts an inner side of the top board 210. The opening portion 330 forms a round opening 331 at the top. The round opening 331 contacts the area between the second thread ring part 220 and the ring protrusion 230. Therefore, the opening portion 330 is limited to move by the second thread ring part 220 and the ring protrusion 230. The opening portion 330 has a ring connection 332 connecting with a surround side wall of the hollow portion 320 at the bottom. The ring platform 123 formed between the accommodating space S and the first thread ring part 122 is used for seating the ring connection 332. The elastic valve element 300 is better made of rubber for its elasticity. Thermoplastic elastomer is also a good option.

Figure 10:
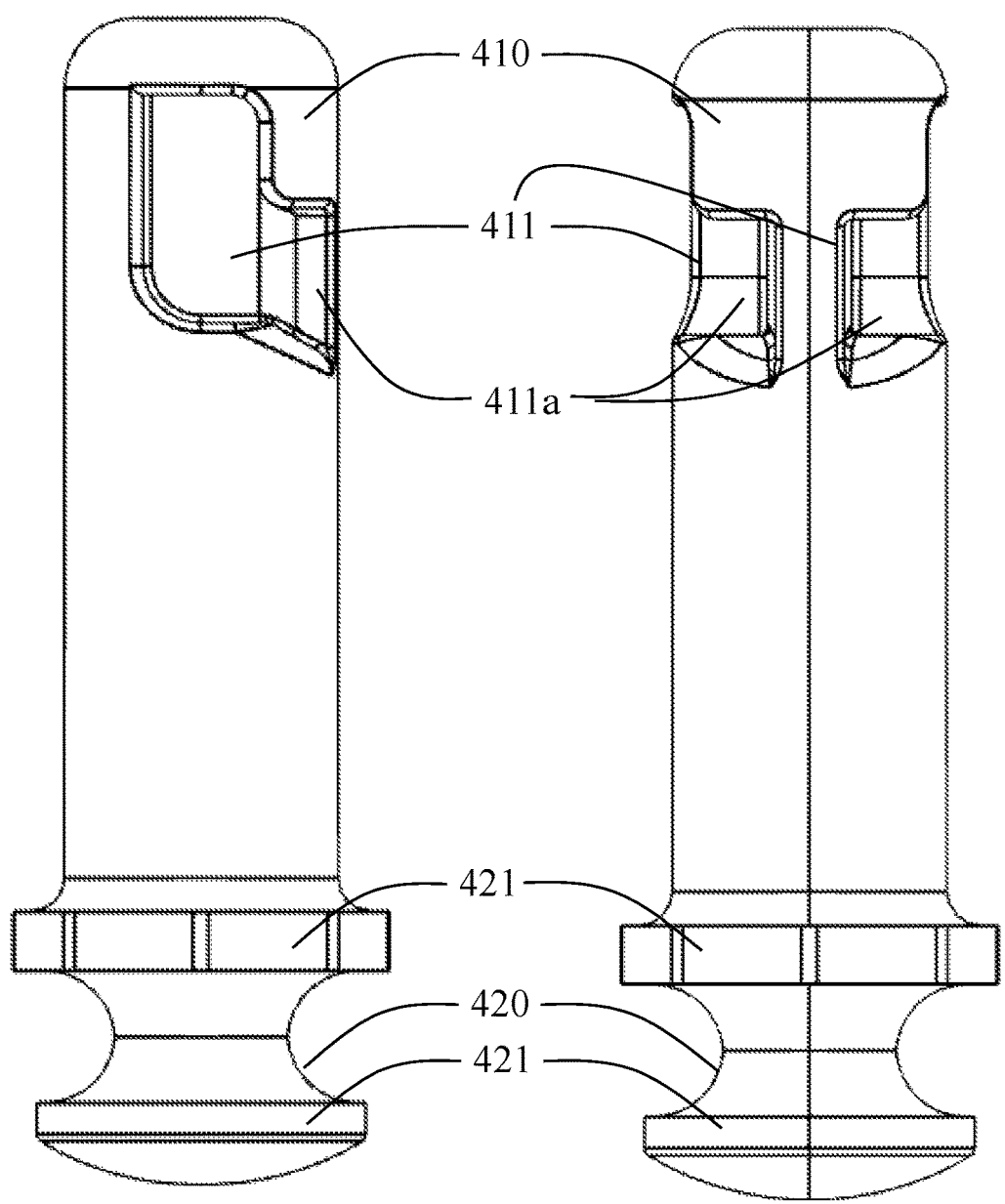
FIG. 10 shows a left side view of a working rod on the left and a front side view of the working rod on the right.
Figure 11:
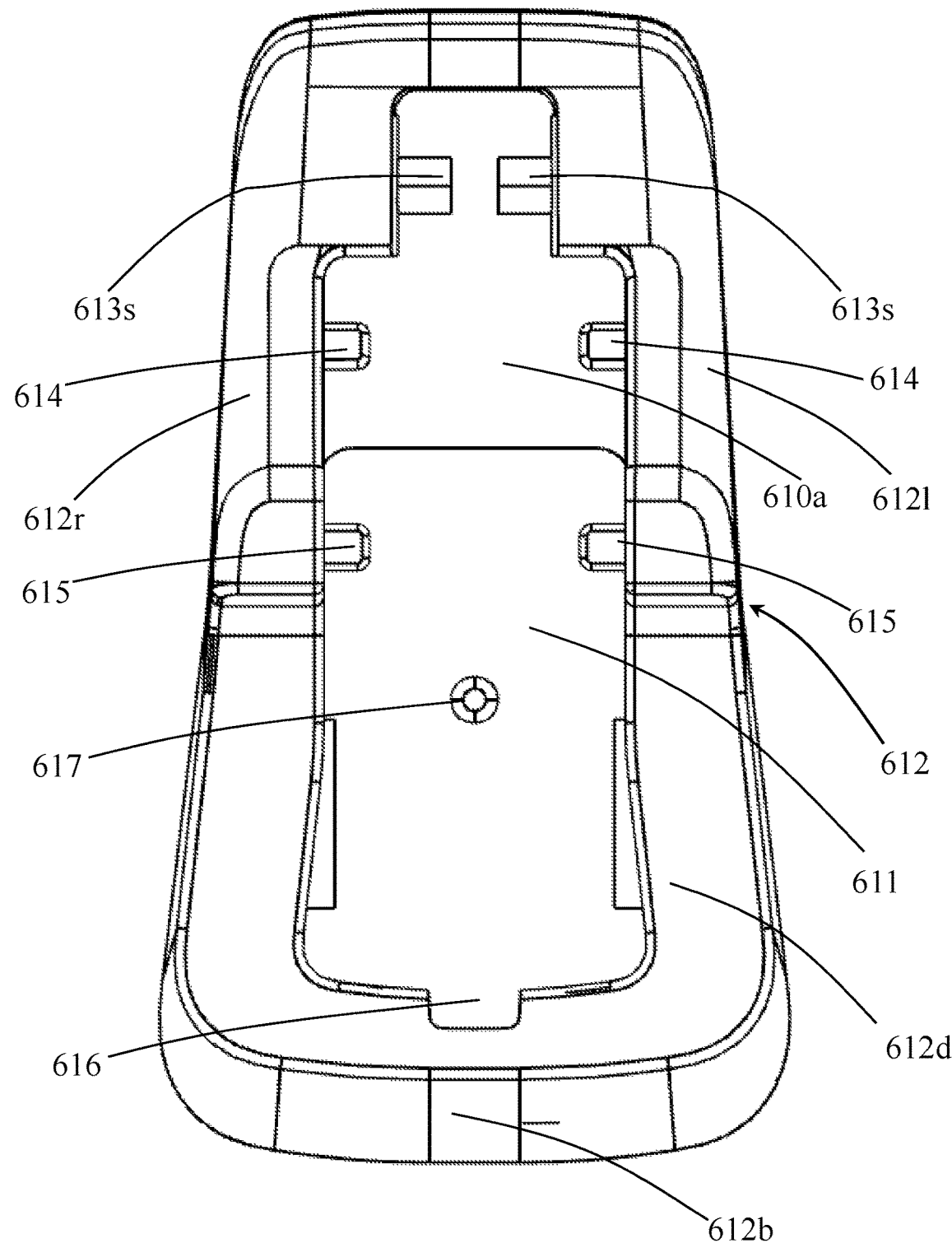
FIG. 11 is a top view of a hollow base portion.

See FIG. 10 and FIG. 11. FIG. 10 shows a left side view of the working rod 400 on the left and a front side view of the working rod 400 on the right. The working rod 400 is a device to change the appearance of the elastic valve element 300. As shown in FIG. 8, the working rod 400 is mounted in the hollow portion 320. The working rod 400 has a connecting end 410 and an anchoring end 420. In this embodiment, the appearance of the working rod 400 is close to a round rod with some specific designs on the two ends.

The working rod 400 goes through the central hole 211 with the connecting end 410 left on an outer side of the top board 210. Two L-shaped grooves 411 symmetrical to each other are formed at the connecting end 410 relative to a longitudinal section of the working rod 400. Each L-shaped groove 411 has a side opening 411a facing the same direction. Two anchoring flanges 421 are formed on the anchoring end 420. The anchoring flanges 421 are inserted into the spaces on two sides of the fixing ring 321, respectively, by the elasticity of the elastic valve element 300. The fixing ring 321 is clipped by the anchoring flanges 421. Thus, the working rod 400 is fixed firmly inside the hollow portion 320 of the elastic valve element 300. Material-wise, working rod 400 can use the same material used for the valve body 100.

The first spring 500 is placed coaxially around the working rod 400. The first spring 500 is compressed by one of the anchoring flanges 421 and the top board 210. The first spring 500 provides resilience to the elastic valve element 300 after being compressed by the working rod 400. Material-wise, the first spring 500 is made of stainless steel.

The safety handle 600 provides a different fool-proof device for the faucet 10. The safety handle 600 is composed of a hollow base portion 610, a safety teeth driving portion 620 and a second spring 630.

Figure 12:
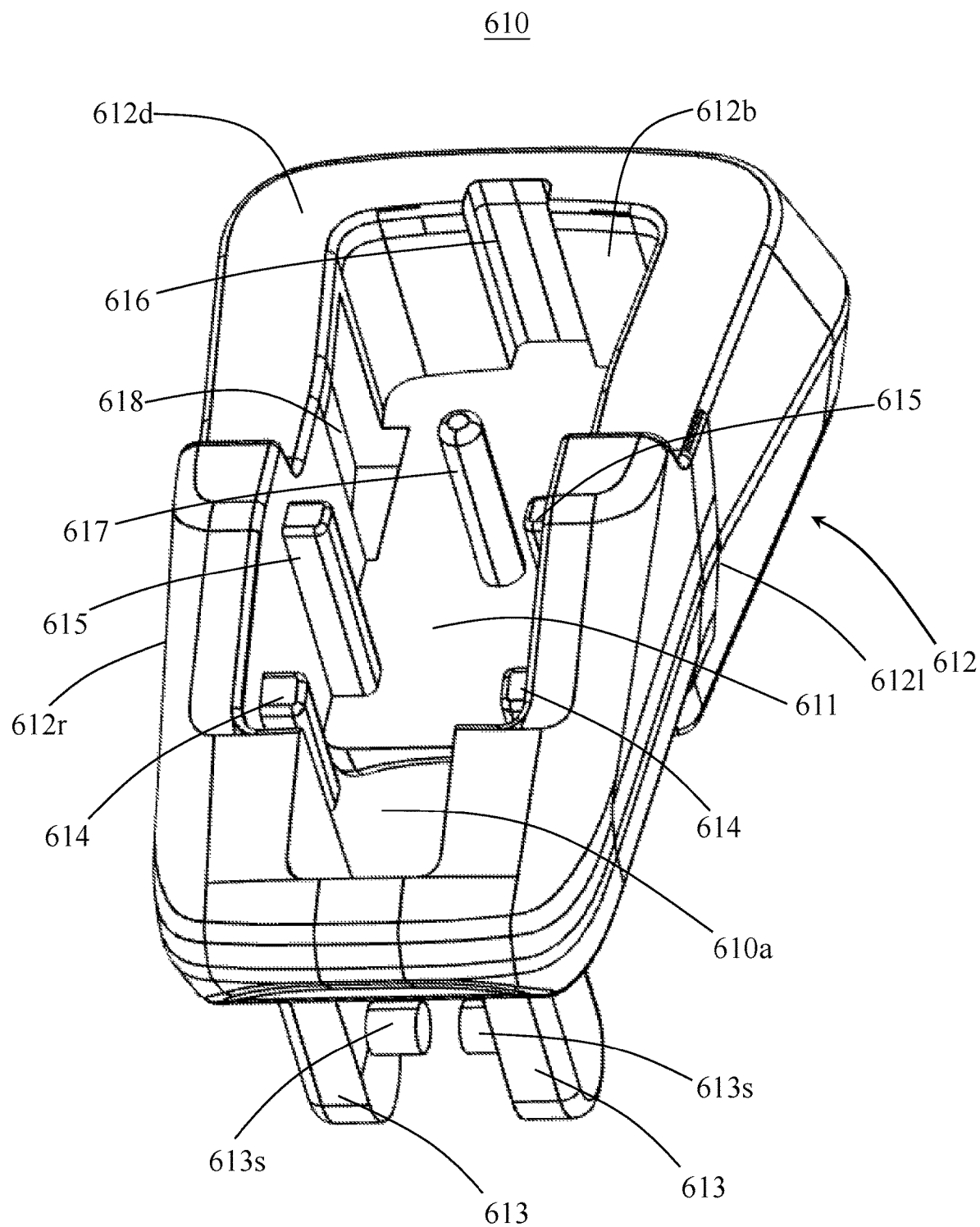
FIG. 12 is a stereogram of the hollow base portion.

Refer to FIG. 11 and FIG. 12. FIG. 11 is a top view of the hollow base portion 610. FIG. 12 is a stereogram of the hollow base portion 610.

Figure 13:
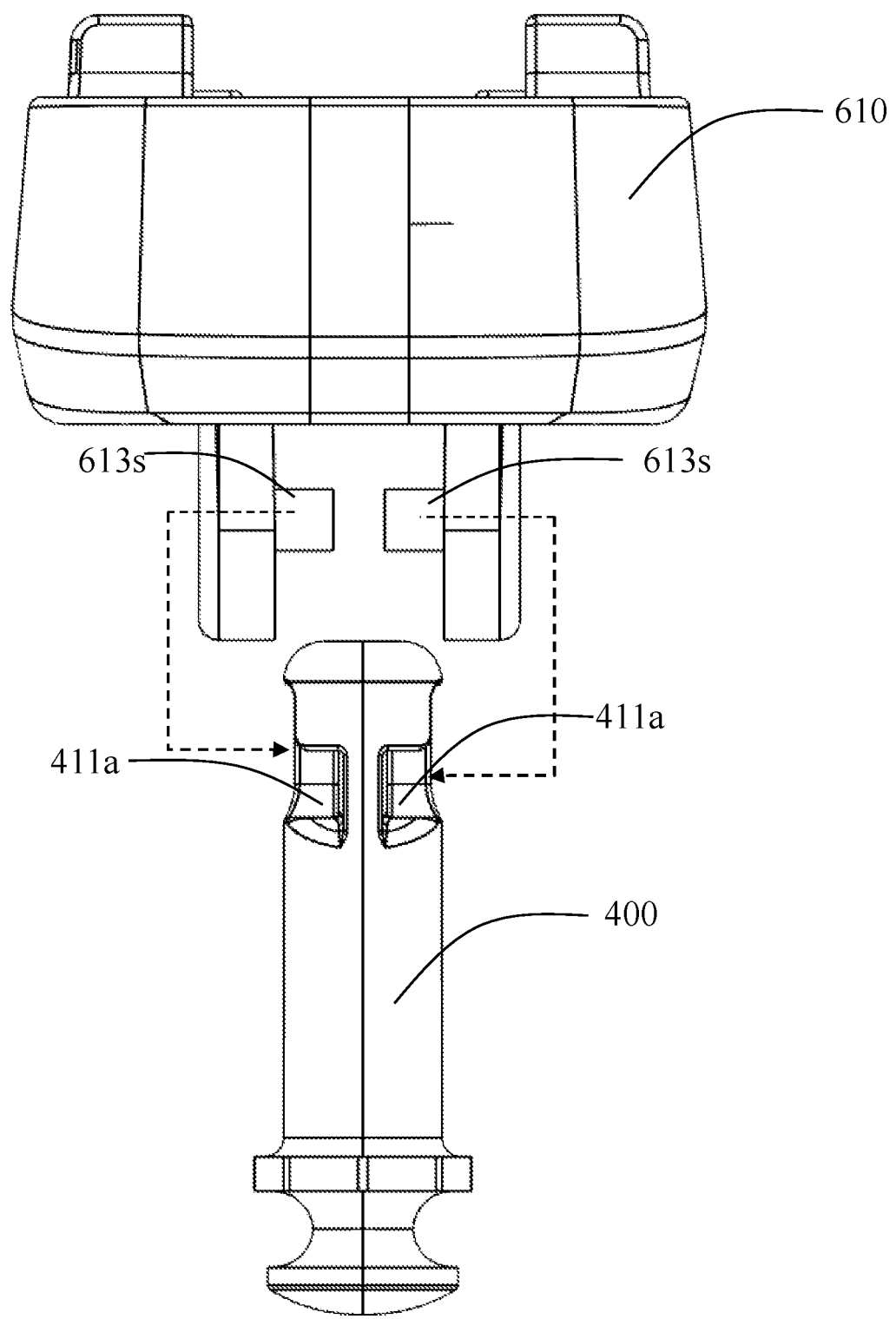
FIG. 13 shows how rotating rods are rotatably connected to a connecting end of the working rod.

The hollow base portion 610 comprises a base board 611, a surrounding body 612, two rotating rods 613, two safety teeth guide bars 614, two first auxiliary guide bars 615, a first auxiliary guide groove 616, an installed rod 617 and two inner lateral depressions 618. The surrounding body 612 encloses the base board 611 and a base opening 610a. The surrounding body 612 and the base board 611 are the infrastructure of the hollow base portion 610. The surrounding body 612 has a number of side walls although the side walls are in different shapes. A portion of the top of the surrounding body is depressed to form a depressed area 612d. Two rotating rods 613 is rotatably connected to the connecting end 410. The base opening 610a is formed next to the rotating rods 613. The rotating rods 613 can be rotatably connected to the connecting end 410 because two rotating shafts 613s are respectively formed on adjacent opposite sides of the two rotating rods 613 facing each other. Each rotating shaft 613s is installed in one L-shaped groove 411 through the corresponding side opening 411a by following the dotted arrows shown in FIG. 13. Two safety teeth guide bars 614 parallel to the rotating rods 613 are formed inside the surrounding body 612 from two opposite side walls (a left side wall 6121 and a right side wall 612r) of the hollow base portion 610, respectively. The goal of the safety teeth guide bars 614 are guiding movement of safety teeth of the safety teeth driving portion 620. Two first auxiliary guide bars 615 parallel to the safety teeth guide bars 614 are formed inside the surrounding body 612 from two opposite side walls (the left side wall 6121 and the right side wall 612r), respectively. The first auxiliary guide bars 615 are used for auxiliary guiding movement of the safety teeth driving portion 620. The first auxiliary guide groove 616 is formed inside the surrounding body 612 on one side wall (a rear side wall 612b) for auxiliary guiding movement of the safety teeth driving portion 620. The installed rod 617 is formed on the base board 611. It is used for installing the second spring 630. Two inner lateral depressions 618 are further formed on the two opposite side walls (the left side wall 6121 and the right side wall 612r), respectively. The other inner lateral depression 618 in FIG. 12 is blocked by the left side wall 6121 and can not be seen in the drawing. It is formed in a location symmetrical to the other one. The purpose of making the inner lateral depressions 618 will be illustrated later. Material-wise, since the hollow base portion 610 is often touched by users, it is better made of Nylon. Preferably, it is made of food grade Nylon or the equivalents.

Figure 14:
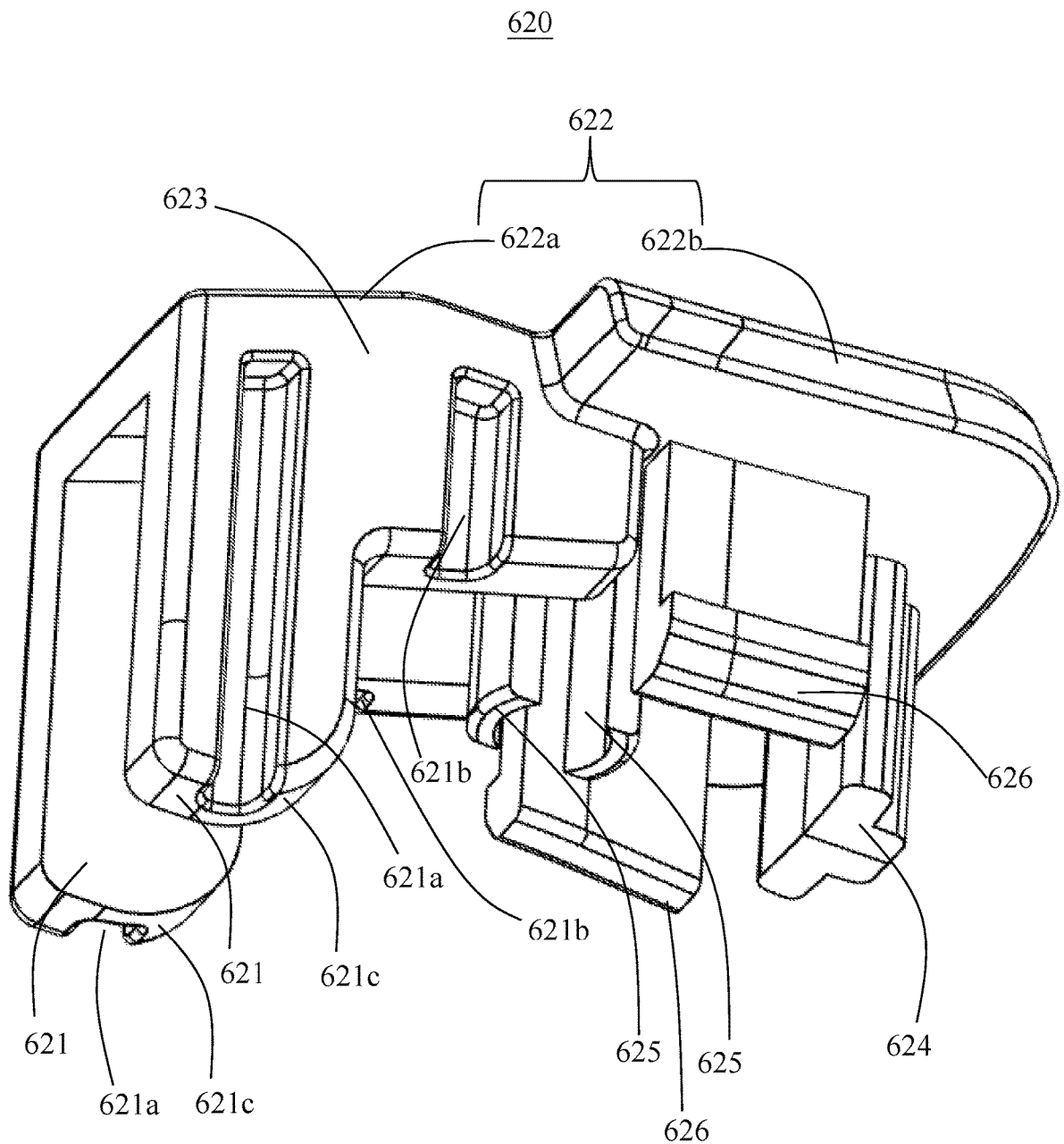
FIG. 14 is a stereogram of a safety teeth driving portion.
Figure 15:
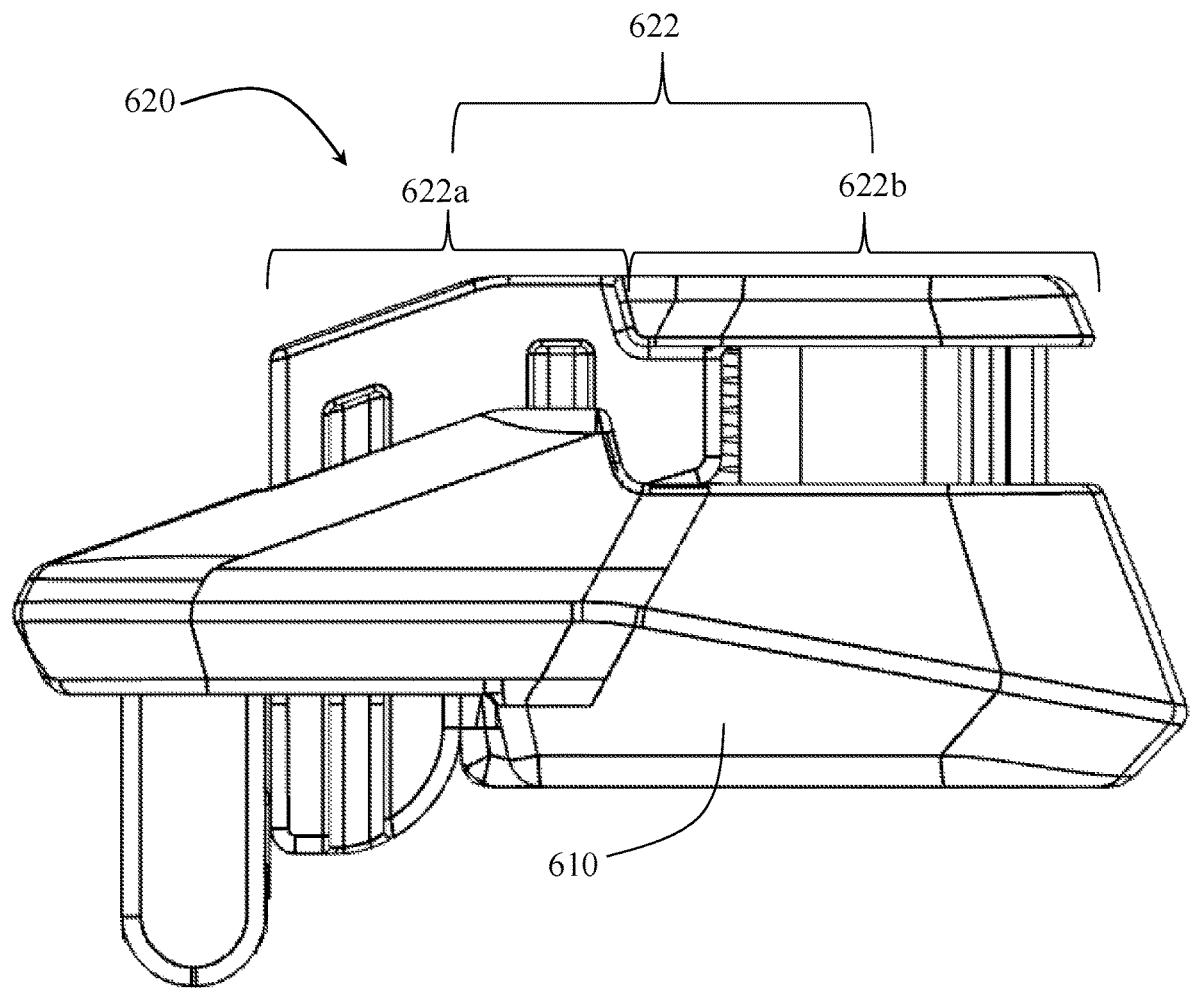
FIG. 15 and FIG. 16 show the safety teeth driving portion moves up and down relative to the hollow base portion.
Figure 16:
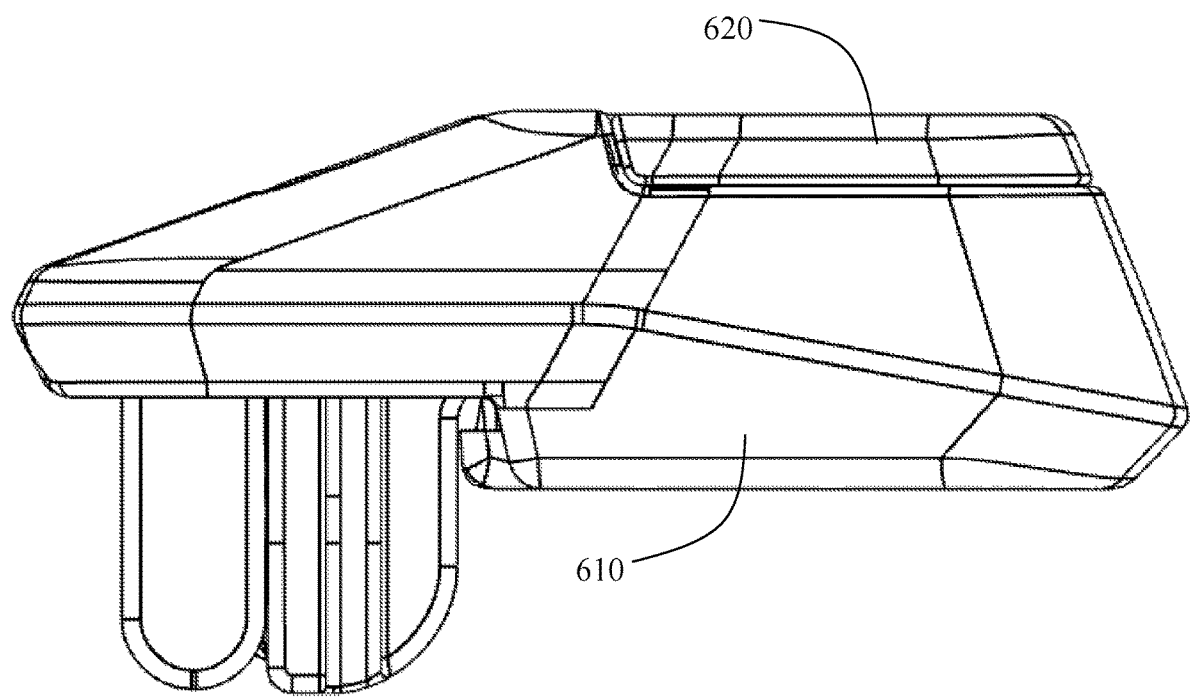
Figure 17:
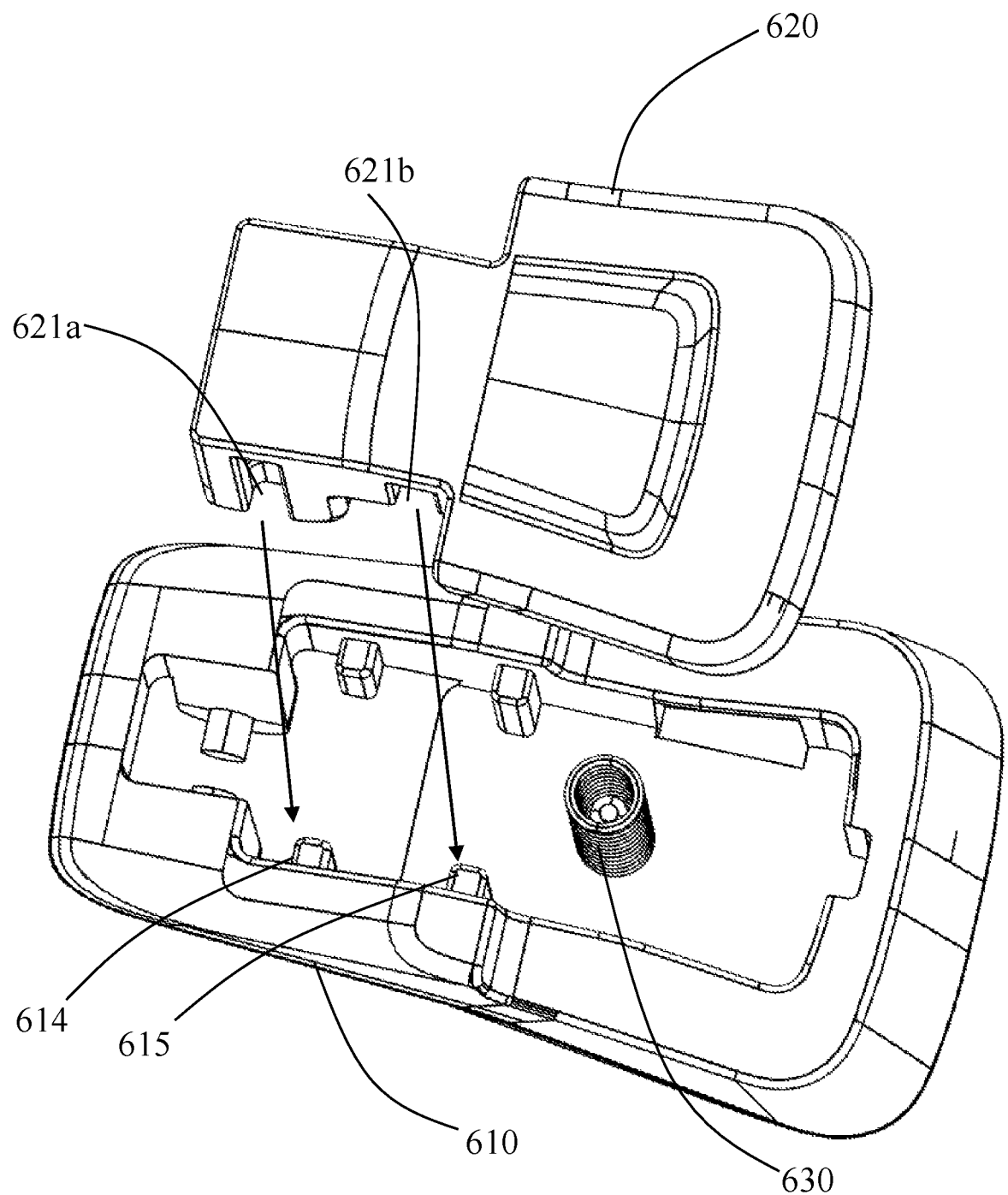
FIG. 17 illustrates how the safety teeth driving portion, the hollow base portion and the second spring are connected.

See FIG. 14. It is a stereogram of the safety teeth driving portion 620. The safety teeth driving portion 620 is coupled with and capable of moving up and down relative to the hollow base portion 610, as illustrated by FIG. 15 and FIG. 16. The safety teeth driving portion 620 comprises: two safety teeth 621, a bent top plate 622, two auxiliary guide boards 623, a second auxiliary guide bar 624, a pair of arc columns 625 and two hooks 626. Two safety teeth 621 through the base opening 610a are an actuator to lift the working rod 400. A fillet 621c is formed on the end of the safety teeth 621. The fillet 621c can make the safety teeth 621 to rotate easier. The bent top plate 622 is an infrastructure of the safety teeth driving portion 620. The bent top plate 622 has a bent area 622a and a finger pressing area 622b. The bent area 622a is formed for the design of the safety teeth 621. The finger pressing area 622b is used for a finger (thumb) to press. In order to prevent the thumb from skidding on the finger pressing area 622b, in FIG. 8, an anti-slip depression 622c can be formed in the top surface of the finger pressing area 622b. Two auxiliary guide boards 623 are formed below the bent area 622a and a portion of the finger pressing area 622b. Two safety teeth 621 are extend from the auxiliary guide boards 623, respectively. Two safety teeth guide grooves 621a are formed on the two safety teeth 621 and two auxiliary guide boards 623, respectively. Each safety teeth guide bar 614 of the hollow base portion 610 is moveably installed in one safety teeth guide groove 621a to guide movement of the safety teeth 621. Refer to FIG. 17. It illustrates how the safety teeth driving portion 620, the hollow base portion 610 and the second spring 630 are connected. The safety teeth guide bar 614 is placed into the corresponding safety teeth guide groove 621a. Thus, the safety teeth 621 will always move along a fixed path that is defined by the safety teeth guide groove 621a. Meanwhile, two second auxiliary guide grooves 621b are formed on two auxiliary guide boards 623, respectively. Each first auxiliary guide bar 615 is moveably installed in one second auxiliary guide groove 621b to auxiliary guide movement of the safety teeth driving portion 620. As shown in FIG. 17, two safety teeth guide groove 621a and two safety teeth guide bar 614 may help the movement of the safety teeth 621, but they are not sufficient to make the whole safety teeth driving portion 620 moving stably. Hence, the first auxiliary guide bars 615 and the second auxiliary guide grooves 621b are auxiliary applied.

The second auxiliary guide bar 624 is formed below the finger pressing area 622b. It is moveably installed in the first auxiliary guide groove 616 to auxiliary guide movement of the safety teeth driving portion 620. There are four groups of guide groove and guide bar in the auxiliary guide boards 623 of the safety teeth driving portion 620. The combination of the second auxiliary guide bar 624 and the first auxiliary guide groove 616 is used to stabilize the movement of the safety teeth driving portion 620 on the rear portion of the hollow base portion 610. Since the second auxiliary guide bar 624 doesn't have a side wall to rely on. It might be easily bent or damaged. Hence, the thickness of the auxiliary guide bar 624 into the first auxiliary guide groove 616 can be thickened, or another assistant bar may be formed together with the auxiliary guide bar 624. As shown in FIG. 14, the auxiliary guide bar 624 in the present embodiment has a T-shaped cross section. The pair of arc columns 625 are formed below the finger pressing area 622b. They are located corresponding to the installed rod 617 for accommodating the second spring 630 and limiting movement of the second spring 630. The two hooks 626 are formed below the finger pressing area 622b. Each hook 626 can hook the brink of one inner lateral depression 618 to prevent the safety teeth driving portion 620 from separating from the hollow base portion 610. The finger pressing area 622b rests on the depressed area 612d when the safety teeth driving portion 620 moves down relative to the hollow base portion 610. Material-wise, since safety teeth driving portion 620 is also frequently touched by users, it is better made of Nylon. Preferably, it is made of food grade Nylon or the equivalents.

The second spring 630, as shown in FIG. 17, is placed between the hollow base portion 610 and the safety teeth driving portion 620, providing force to move the safety teeth driving portion 620 up relative to the hollow base portion 610. More precisely, the second spring 630 is inserted by the rod formed 617 and enclosed by the arc columns 625. In practice, the second spring is made of stainless steel or equivalent.

Figure 18:
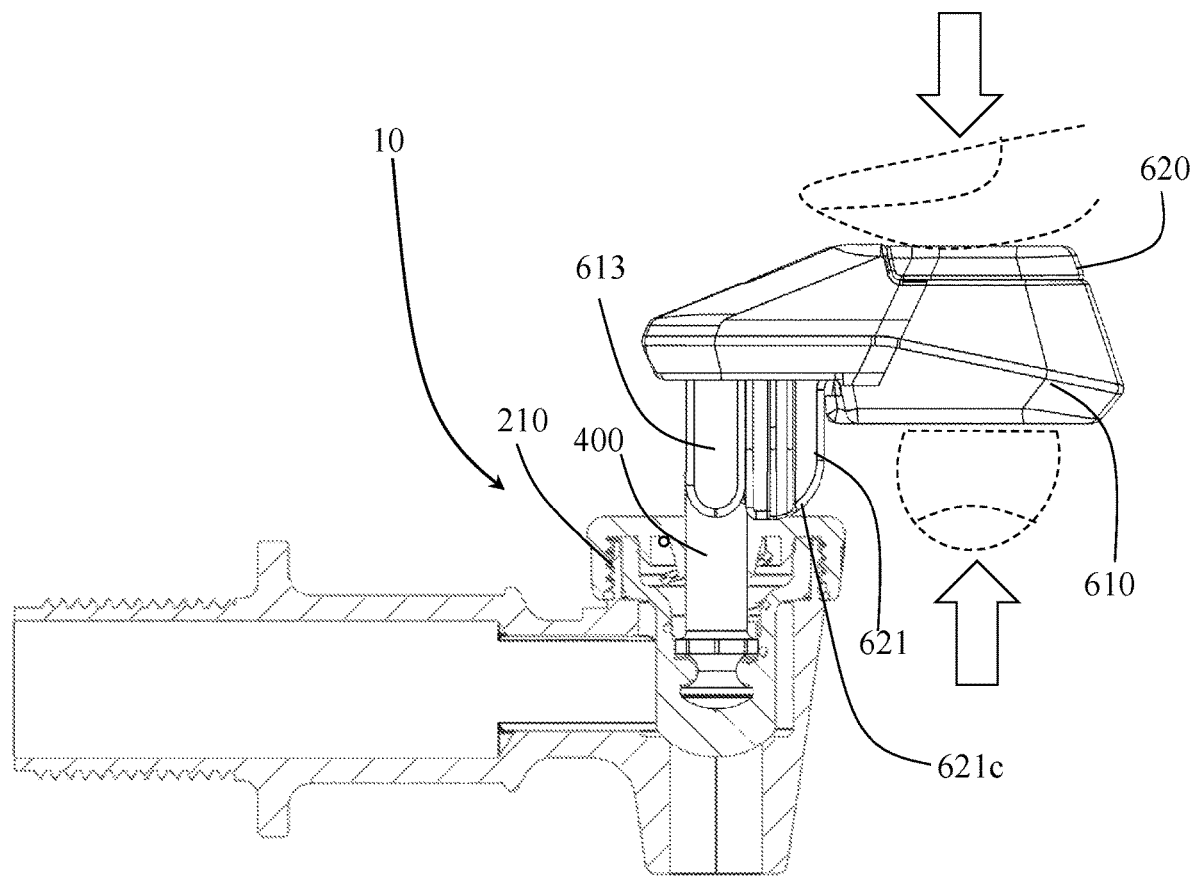
FIG. 18 and FIG. 19 show two steps to operate the safety handle for the faucet.
Figure 19:
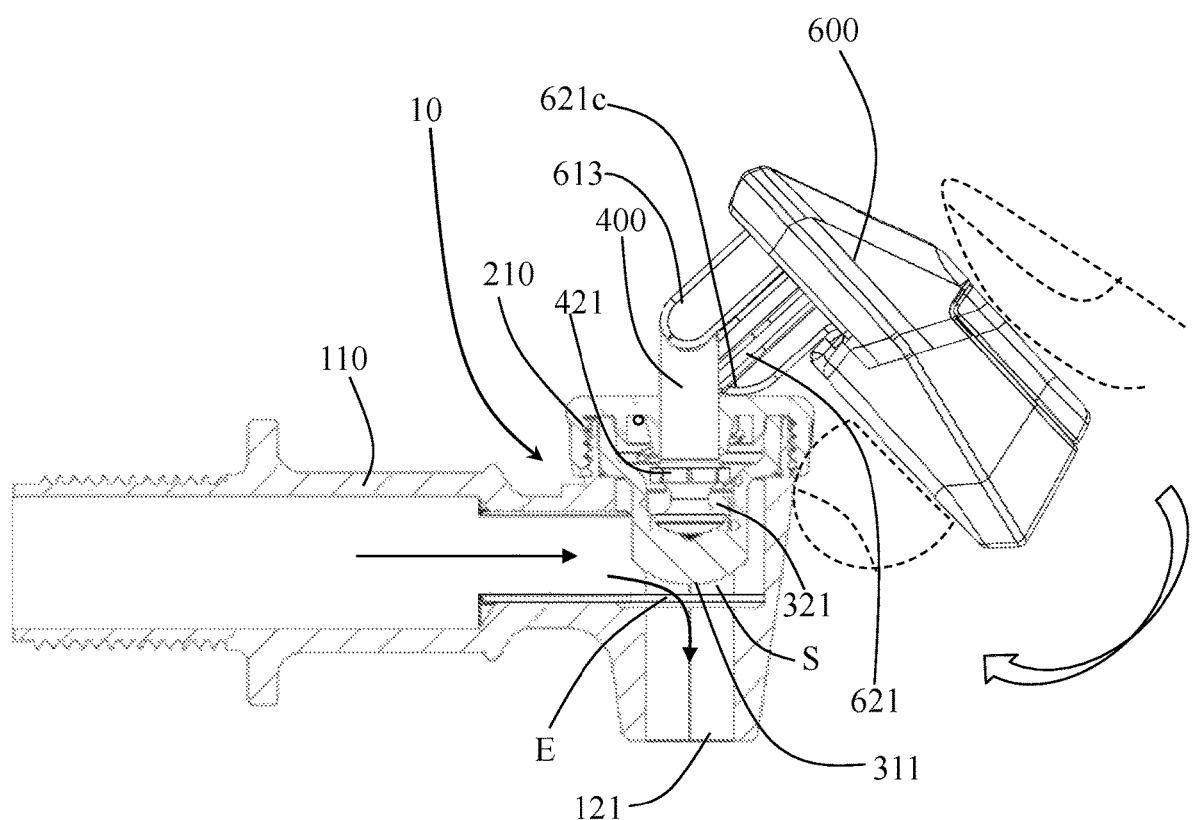

FIG. 18 and FIG. 19. They show two steps to operate the safety handle 600 for the faucet 10. In FIG. 18, when the user uses his thumb and the index finger to clamp the safety teeth driving portion 620 and the hollow base portion 610, the safety teeth driving portion 620 moves down relative to the hollow base portion 610 The safety teeth 621 contact the outer side of the top board 210. In FIG. 19, a torque (illustrated by the curved arrow) applied to the safety handle 600 by the two finger will cause the rotating rods 613 to lift the working rod 400 with the safety teeth 621 being a fulcrum. The fillets 621c of the safety teeth 621 makes the safety teeth 621 (fulcrum) to rotate easier. Thus, the elastic valve element 300 is compressed by the fixing ring 321 moved with the anchoring flanges 421. The bottom curved surface 311 is away from the entrance E. The liquid in the inlet tube portion 110 and the accommodating space S is able to flow through the outlet tube 121, following the directions of arrow lines in the inlet tube portion 110 and the accommodating space S. If user release the safety handle 600, the safety teeth 621 come back to the original position. The working rod 400 will also return to its original state. The bottom curved surface 311 blocks the entrance E again. No liquid will flow from the valve body 100 no matter how large the torque is applied.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A safety handle for a faucet comprising:
    a hollow base portion having two rotating rods rotatably connected to a working rod of the faucet and a base opening formed next to the rotating rods;
    a safety teeth driving portion coupled with and being capable of moving up and down relative to the hollow base portion, having two safety teeth through the base opening; and
    a second spring placed between the hollow base portion and the safety teeth driving portion, providing force to move the safety teeth driving portion up relative to the hollow base portion,
    wherein the hollow base portion further comprises:
    a base board;
    a surrounding body enclosing the base board and the base opening, having a plurality of side walls, wherein a portion of the top of the surrounding body is depressed to form a depressed area;
    two safety teeth guide bars parallel to the rotating rods, formed inside the surrounding body from two opposite side walls, respectively, for guiding movement of the safety teeth;
    two first auxiliary guide bars parallel to the safety teeth guide bars, formed inside the surrounding body from two opposite side walls, respectively, for auxiliarily guiding movement of the safety teeth driving portion; and
    an installed rod formed on the base board for installing the second spring.

2. The safety handle for a faucet according to claim 1, wherein the faucet comprises:
    a valve body for conducting liquid, having an inlet tube portion and an outlet tube portion, wherein an accommodating space where the inlet tube portion is connected to is formed inside the outlet tube portion, an outlet tube in the outlet tube portion connects the accommodating space and external environment, and a first thread ring part is formed in the outlet tube portion opposite to the outlet tube;
    a top cover having a top board and a second thread ring part formed therearound, wherein the second thread ring part is removably connected to the first thread ring part, and a central hole is formed through the top board;
    an elastic valve element fixed in the accommodating space with a bottom curved surface sealing an entrance of the outlet tube to the accommodating space and an opening portion contacting an inner side of the top board, forming a hollow portion in the center and having a fixing ring inwardly formed inside the hollow portion;
    the working rod mounted in the hollow portion, having a connecting end rotatably connected to the rotating rods and an anchoring end, wherein the working rod goes through the central hole with the connecting end left on an outer side of the top board, two anchoring flanges are formed on the anchoring end, and the fixing ring is clipped by the anchoring flanges; and
    a first spring placed coaxially around the working rod, being compressed by one of the anchoring flanges and the top board.

3. The safety handle for a faucet according to claim 2, wherein when the safety teeth driving portion moves down relative to the hollow base portion and the safety teeth contact the outer side of the top board, a torque applied to the safety handle causes the rotating rods to lift the working rod with the safety teeth being a fulcrum, so that the elastic valve element is compressed by the fixing ring moved with the anchoring flanges, the bottom curved surface is away from the entrance, and the liquid in the inlet tube portion and the accommodating space is able to flow through the outlet tube.

4. The safety handle for a faucet according to claim 2, wherein the opening portion of the elastic valve element has a round opening at the top and a ring connection connecting with a surround side wall of the hollow portion at the bottom.

5. The safety handle for a faucet according to claim 4, wherein a ring protrusion of the opening portion is formed and extended from the top board between the second thread ring part and the central hole, the round opening contacts the area between the second thread ring part and the ring protrusion, and the opening portion is limited to move by the second thread ring part and the ring protrusion.

6. The safety handle for a faucet according to claim 4, wherein a ring platform is formed between the accommodating space and the first thread ring part for holding the ring connection of the opening portion.

7. The safety handle for a faucet according to claim 2, wherein two L-shaped grooves symmetrical to each other are formed at the connecting end relative to a longitudinal section of the working rod, and each L-shaped groove has a side opening facing the same direction.

8. The safety handle for a faucet according to claim 7, wherein two rotating shafts are respectively formed on adjacent opposite sides of the two rotating rods of the hollow base portion, and each rotating shaft is installed in one L-shaped groove of the working rod through the corresponding side opening.

9. The safety handle for a faucet according to claim 1, wherein the safety teeth driving portion further comprises:
 a bent top plate having a bent area and a finger pressing area;
 two auxiliary guide boards formed below the bent area and a portion of the finger pressing area, wherein two safety teeth extend from the auxiliary guide boards, respectively, two safety teeth guide grooves are formed on two safety teeth and two auxiliary guide boards, respectively, each safety teeth guide bar of the hollow base portion is moveably installed in one safety teeth guide groove to guide movement of the safety teeth, two second auxiliary guide grooves are formed on two auxiliary guide boards, respectively, each first auxiliary guide bar of the hollow base portion is moveably installed in one second auxiliary guide groove to auxiliarily guide movement of the safety teeth driving portion; and
 a pair of arc columns formed below the finger pressing area and located corresponding to the installed rod for accommodating the second spring and limiting movement of the second spring,
 wherein the finger pressing area rests on the depressed area when the safety teeth driving portion moves down relative to the hollow base portion.

10. The safety handle for a faucet according to claim 9, wherein two inner lateral depressions are further formed on the two opposite side walls of the hollow base portion, respectively, two hooks are further formed below the finger pressing area, and each hook hooks the brink of one inner lateral depression to prevent the safety teeth driving portion from separating from the hollow base portion.

11. The faucet according to claim 9, wherein an anti-slip depression is further formed in the top surface of the finger pressing area.

12. The safety handle for a faucet according to claim 2, wherein an external thread or an internal thread is formed on one end of the inlet tube portion for connecting a pipe.

13. The safety handle for a faucet according to claim 1, wherein a fillet is formed on the end of the safety teeth.

14. The safety handle for a faucet according to claim 1, wherein the safety teeth driving portion and the hollow base portion are made of Nylon.

15. The safety handle for a faucet according to claim 2, wherein the first spring and the second spring are made of stainless steel.

\* \* \* \* \*